(12) United States Patent
Liu et al.

(10) Patent No.: US 7,643,480 B2
(45) Date of Patent: Jan. 5, 2010

(54) METHOD AND SYSTEM FOR RELIABLY AND EFFICIENTLY TRANSPORTING DATA OVER A NETWORK

(76) Inventors: Hain-Ching Liu, 42600 Palm Ave., Fremont, CA (US) 94539; Ji Zhang, 16225 Oakhurst Dr., Monte Sereno, CA (US) 95030; Jiangang Ding, 1218 Mayberry La., San Jose, CA (US) 95131

( * ) Notice: Subject to any disclaimer, the term of this patent is extended or adjusted under 35 U.S.C. 154(b) by 662 days.

(21) Appl. No.: 11/041,079

(22) Filed: Jan. 21, 2005

(65) Prior Publication Data
US 2008/0151881 A1 Jun. 26, 2008

Related U.S. Application Data

(60) Provisional application No. 60/538,788, filed on Jan. 22, 2004.

(51) Int. Cl.
*H04L 12/56* (2006.01)
(52) U.S. Cl. .................. 370/389; 370/228; 709/239
(58) Field of Classification Search ......... 370/219, 370/220, 227, 228, 233, 234, 389, 394; 709/239; 714/6, 48, 799
See application file for complete search history.

(56) References Cited

U.S. PATENT DOCUMENTS

| 7,043,677 | B1 * | 5/2006 | Li ........................ 714/758 |
| 2004/0120252 | A1 * | 6/2004 | Bowen et al. ............ 370/229 |
| 2005/0021821 | A1 * | 1/2005 | Turnbull et al. .......... 709/232 |

* cited by examiner

*Primary Examiner*—Jayanti K Patel
*Assistant Examiner*—Matthew Campbell
(74) *Attorney, Agent, or Firm*—Stolowitz Ford Cowger LLP

(57) ABSTRACT

A data transport system for transporting data between a server (21) and a client receiver (27) over a network (23) includes a receiving proxy cache (25) coupled to a client receiver (27) via a reliable connection (29), such as a cable connection. The majority of data is transported from the server (21) to the receiving proxy cache (25) over an efficient data transmission channel (41). The receiving proxy cache (25) verifies the status of the data transmitted over the efficient channel (41). If there is an error in the data transmission, a portion of the data associated with the error is retransmitted from the server (21) to the receiving proxy cache (25) over a reliable data transmission channel (43). The complete data at the receiving proxy cache (25) is delivered to a client receiver (27) over a reliable connection (29).

62 Claims, 8 Drawing Sheets size of assembly buffer must be sufficient for the largest possible end-to-end error detection and retransmission latency

METHOD AND SYSTEM FOR RELIABLY AND EFFICIENTLY TRANSPORTING DATA OVER A NETWORK

REFERENCE TO PRIOR APPLICATION

Under 35 U.S.C. § 119(e), this application for patent claims the benefit of the filing date of U.S. Provisional Application Ser. No. 60/538,788, titled "Methods for Providing Reliable Transport Using UDP and TCP Protocols" and filed on Jan. 22, 2004.

FIELD OF THE INVENTION

The present invention relates, in general, to data transport and delivery over a network and, more specifically, to providing reliable delivery of media data over a potentially unreliable Internet Protocol network. Typically, the transport and delivery of media data over a network is an especially demanding application, as the data payloads are large, and the real-time constraints are stringent.

BACKGROUND OF THE INVENTION

Internet Protocol (IP) networks have become ubiquitous data infrastructures for delivering digital information world wide, particularly for data, voice and streaming video. As an increasing amount of data traffic delivered over IP networks contains multimedia content, the issue of providing reliable and high-throughput transport of such data has become more important.

For example, in a system for delivering media content (particularly digital video content) that may or may not be compressed, there are servers for sending out the media content and receivers for receiving the media content. The server typically holds the content in disk drive based storage arrays. The receivers may also store the received content in local disk drive arrays, or may decode and display the content on local display devices. Such an environment has several aspects that differentiate it from other forms of data delivery. First, the data files are typically very large, comprising multiple gigabytes (GB) or more of data. Second, the data delivery must be at a high bit rate, usually at multiple megabits per second or higher. Furthermore, certain levels of timing control must be maintained during the delivery. These timing requirements impose restrictions on the amount of acceptable delay and delay jitter during the data transmission.

Many network infrastructures, however, are designed and implemented with non-time-sensitive computer data in mind. Reliable delivery of data is guaranteed by end-to-end network protocols, e.g., Transmission Control Protocol (TCP) protocols. In TCP protocol, data is transferred and verified by both the sender and receiver to ensure correctness (i.e., to ensure that the binary data is not altered due to data transmission errors). Such protocols have evolved over the years to become capable of delivering data over different types of network transmission lines and over long distances.

For digital media content, particularly for digital video data, merely delivering the data without bit errors is often insufficient. Digital video data usually has a timing requirement because encoded video images must be decoded at the receiver at fixed time intervals. As a result, the receiver's decoder buffer must have sufficient data for decoding. For real-time delivery of a compressed video bitstream over a network, the data blocks must arrive at the receiver at prescribed times to avoid receiver buffer overflow or underflow. In addition, when the digital media content is delivered over a network under the direction of the receiving client, end-to-end transport latency must be low. However, the TCP network transport protocol is not designed for such real-time delivery with low latency because they do not guarantee the end-to-end delay jitter and latency of the delivered data. As a result, even though data may arrive at the receiver correctly, it may arrive either too late or too early. In addition, the computational complexity of the TCP protocol is relatively large because both the sender and the receiver must each maintain state machines at their end of the connection. "State machines" are well known to those of ordinary skill—this refers to "finite state machines" which can be in a limited number of states, and which change from one state to another in response to an event, such as the arrival of a given packet from the other party over, for example, a TCP connection. These state machines are designed to help ensure that the transmitted data blocks are all accounted for, whether they are in a server buffer, in a receiver buffer or in transit from the server to the receiver. In addition, the state machines maintain the order of the data arriving at the receiver and deal with lost, duplicate, and out-of-order data blocks or packets. Often this additional computational overhead is taken up by co-processor engines designed to offload and handle only the TCP processing, which improves performance at the expense of increased overall system cost and complexity.

When using the TCP protocol, the server holds the data in the server buffer until it receives confirmation from the receiver that up to a certain amount of data has been received, at which point the server buffer is cleared of the successfully transmitted data blocks. The server maintains a finite buffer size, often referred to as its transmission window. If the server transmit buffer is full and no portion of its data has been confirmed by the receiver as being correctly received, the server will stop transmission until either such confirmation arrives or a time-out occurs. At time-out, a portion of the data in the server buffer will be retransmitted and the whole process begins again. In addition, adaptive slow-start algorithms are used to ensure that transmitted data does not flood the network causing massive retransmissions and reducing the overall efficiency.

With the TCP protocol, it is possible to send data packets via many different paths through an IP network and still ensure that the packets are delivered to the destination process in correct order without duplicates, errors or packet loss. The throughput of such transport protocols, however, depends on the quality of the transport network delivery, which is based on factors including bit error rate, packet loss rate, transmission delay and jitter, packet re-order rate, etc. For example, if a data block is lost during transit within the network, the server must wait till time-out and then retransmit the data block. Network delivery latency, packet loss, and packets out-of-order may significantly decrease the end-to-end transport throughput through retransmissions and time-outs.

An alternate transport protocol, User Datagram Protocol (UDP), was developed to create alternatives to the constraints imposed by TCP. UDP can be used to increase end-to-end transport throughput. It tends to be less complex than TCP, but it does not offer the above-described features that can make TCP so useful in certain applications, such as guaranteeing against lost, duplicated, or out-of-order packets. Instead, the UDP protocol is a stateless implementation that does not require the server and receiver to each maintain a state machine to ensure correct transmission. Specifically, with the UDP implementation, an application process at the server segments the data into blocks, encapsulates them into UDP and then IP packets, and delivers them over the IP network with best efforts (i.e., without waiting for receiving acknowledgement). As a result, there is no retransmission of packets and no sliding windowing buffers. A server using UDP is thus capable of delivering data blocks very efficiently without the need to hold the data in its buffer and wait for confirmation, but lost and out-of-order packets are not reported to the server. Therefore, UDP transport does not ensure the quality of data delivery and is usually suitable only for use in reliable networks or for situations where unreliable data delivery is acceptable by the end applications.

The foregoing illustrates that UDP and TCP based transmissions each have their own benefits and weaknesses. UDP transmission is efficient, and because it does not require a one-to-one connection between the sender and the receiver, it can also be used to provide multicasting of video or other rich content (e.g., delivering copies of the same video data to multiple locations). In addition, end-to-end transmission delay is bounded by the inherent delay of the network transport as no retransmission is provided and thus there is no extra buffer delay within the server. As previously discussed, however, UDP transmission cannot guarantee data transmission reliability. On the other hand, while TCP based transmissions are highly reliable, general control of delivery timing is not possible because it is a function of the quality of service (QoS) of the underlying network. An unreliable network will force retransmission of packets, resulting in excessive delays. Thus the average end-to-end delay and delay jitter can well exceed that of the actual network transport delay and delay jitter.

In sum, for large scale distribution of digital video programs through digital cable, digital subscriber line (DSL), Ethernet or other broadband networks, it is extremely important that the digital video data can be delivered to large number of end client receivers with high efficiency, high bandwidth and reliability. This places significant demands on the network, content storage, distribution equipment, and processing requirement to achieve high input/output (I/O) throughput and more importantly, the QoS required for these applications. It would, therefore, be advantageous to have a method and a system capable of transporting such data over different types of networks with high efficiency, low latency and high reliability.

SUMMARY OF PREFERRED EMBODIMENTS OF THE INVENTION

The present invention comprises, in a number of embodiments, a method and system for reliably and efficiently transporting data over a network. The method and system of these embodiments has high data transport throughput with minimum transmission delay and buffer delay. The method and system of these embodiments is also able to guarantee data delivery to the receiving process in the right order. In accordance with one embodiment, the present invention provides a method and a system for establishing reliable data transport using a data caching system. A key benefit of the data transporting method in accordance with the present invention is that it is capable of transporting data at an efficiency comparable to that of User Datagram Protocol (UDP) transport while maintaining complete reliability like that of the Transmission Control Protocol (TCP) transport.

While various embodiments are discussed in terms of digital video programs, it would also be advantageous to be able to distribute other data having similar performance requirements, such as visualization input data for large-scale distributed scientific visualization systems. Thus, the following description is intended to encompass transporting data not only for video programs, but for content data of all types.

Other features and advantages of the present invention will become apparent to those of skill in the art through consideration of the ensuing description, the accompanying drawings, and the appended claims.

DETAILED DESCRIPTION OF VARIOUS EMBODIMENTS

Figure 1:
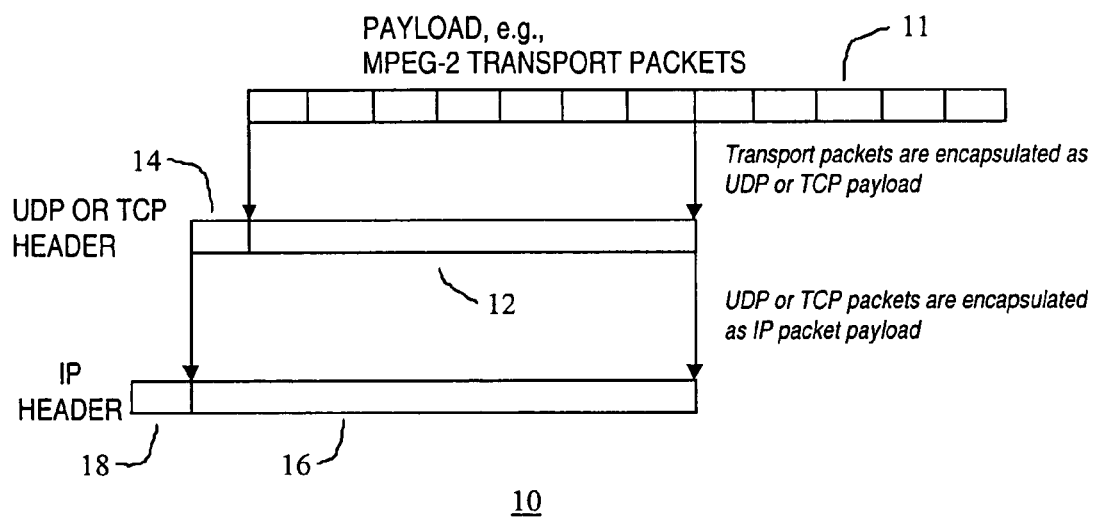
FIG. 1 illustrates a process for encapsulating data into a network protocol data packet in accordance with an embodiment of the present invention.

Various embodiments of the present invention are described hereinafter with reference to the drawings, in which the same or related reference numerals are used to represent related elements throughout the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in conjunction with any other embodiment of the invention.

FIG. 1 illustrates how data is encapsulated into network protocol packets. By way of example, FIG. 1 shows a process 10 in which Motion Pictures Coding Experts Group (MPEG) transport packets 11 are encapsulated into Internet Protocol (IP) packets 16. First, one or more MPEG transport packets 11 are encapsulated into a UDP or TCP packet payload 12. A UDP or TCP header 14 is added to UDP or TCP packet payload 12. The combination of UDP or TCP header 14 and UDP or TCP packet payload 12 is then encapsulated into one or more IP data packets 16, which are each preceded by an IP header 18. It should be noted that what content is contained in MPEG transport packets 11 or whether payload 12 includes MPEG packets or some other data is immaterial to IP packet 16, and other types of data are contemplated as being within the scope of the present invention.

Figure 2:
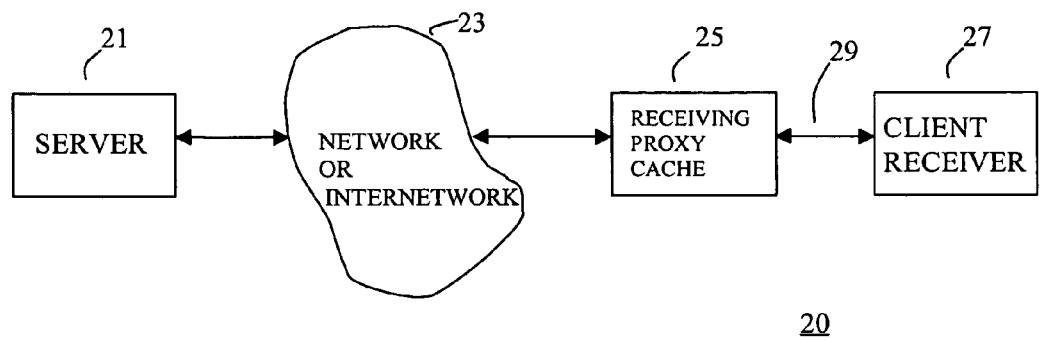
FIG. 2 illustrates a system for transporting data over a network in accordance with an embodiment of the present invention.

FIG. 2 illustrates an exemplary system 20 for transporting data over a network or an internet in accordance with the present invention. System 20 includes a server 21, a transport network 23, a receiving proxy cache 25, and a client receiver 27. Server 21 functions as a sender for sending data to receiving proxy cache 25 across network 23. Receiving proxy cache 25 functions as a receiver for receiving data transmitted from server 21 over network 23. Generally, network 23 is assumed to be unreliable and susceptible to data packet loss, data packet reordering, and excessive data transmission delay with uncertain latencies. A data stream connection 29 between receiving proxy cache 25 and client receiver 27 is assumed to be reliable, or if not, a reliable transmission method based on TCP or methods described in this invention can also be utilized between receiving proxy cache 25 and client receiver 27. Receiving proxy cache 25 relays or forwards the data received from server 21 over network 23 to client receiver 27 over connection 29. In this respect, receiving proxy cache 25 functions as a data relay buffer or a memory device for temporarily storing the data for client receiver 27. By way of example, connection 29 between receiving proxy cache 25 and client receiver 27 may be a cable distribution network where the connection is mostly pre-provisioned point-to-point transport, or can be digital subscriber line (DSL) or Ethernet based networks. In accordance with various embodiments of the present invention, connection 29 can be implemented with coaxial cables, Digital Subscriber Line service (DSL), Layer 2 metropolitan Ethernet networks, Layer 3 IP networks, optical fiber networks, etc.

Server 21 holds the digital content programs, such as video media content to be delivered to one or more client receivers 27. Server 21 establishes connections with receiving proxy cache 25 through network 23. Receiving proxy cache 25 may be, for example, a media caching system that has a large local cache. A local cache is typically implemented by solid state dynamic RAM (DRAM) buffer memory, which have significantly higher input/output (I/O) throughput and much lower latency than disk drive based storage. In applications where the I/O throughput requirement is not high, disk drive based storage systems can also function as a cache. Because reliable data transport must be established between server 21 and client receivers 27, receiving proxy cache 25 is preferably capable of repairing the loss of data packets, or the out-of-order arrival of data packets, by requesting and accepting retransmitted data packets, and by reordering the data packets received from server 21 where necessary. Receiving proxy cache 25 is also preferably capable of discarding duplicate packets upon their arrival.

Figure 3:
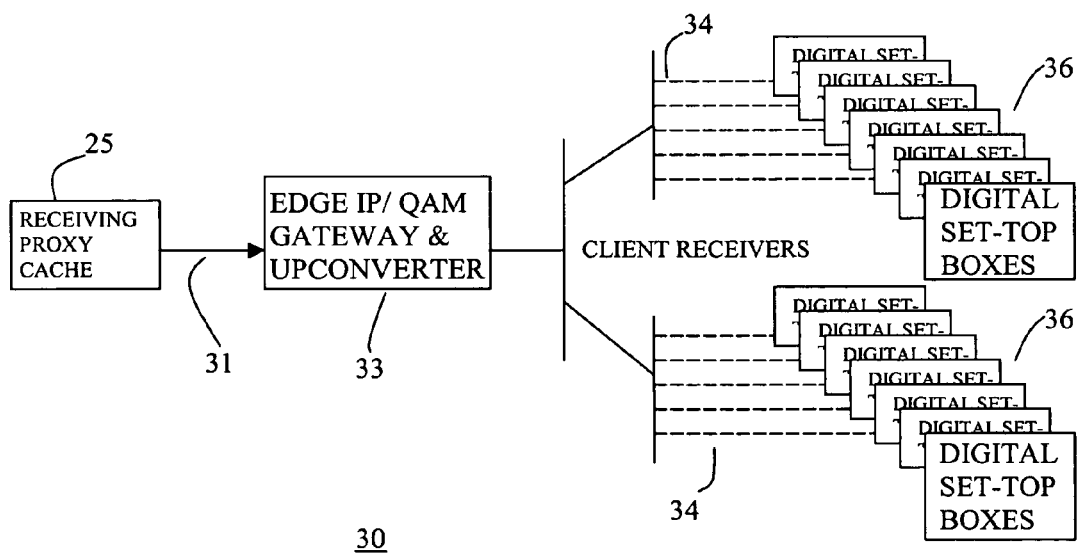
FIG. 3 illustrates a system for distributing data from a receiving proxy cache to a plurality of client receivers in accordance with an embodiment of the present invention.

FIG. 3 illustrates an exemplary system 30 for distributing data from receiving proxy cache 25 to a plurality of client receivers 27 in accordance with the present invention. As shown in FIG. 3, data, e.g., compressed or uncompressed video data, is delivered from receiving proxy cache 25 via a gigabit Ethernet interface 31 to an edge Quadrature Amplitude Modulation (QAM) gateway 33. Edge QAM gateway 33 packages the video data into groups, referred to as multiplexes. Logical information is embedded in the video data so that the video programs can be separated from the multiplexes later at the receiver side. The multiplexes are delivered in QAM channels over coaxial cable networks 34 to client receivers 27, which in FIG. are illustrated as comprising consumer digital set-top boxes 36. Again, while video data is frequently cited here, this invention is equally suited to transporting and distributing other kinds of program content data having similar performance requirements.

It should be understood that the data might be distributed from receiving proxy cache 25 to the client receivers 27 via other means. For example, in accordance with an alternative embodiment of the present invention, receiving proxy cache 25 may deliver the video program data over IP to a DSL Access Multiplexer (DSLAM), which then delivers the content to many individual DSL-attached client receivers. In accordance with another alternative embodiment, the content may then be directly delivered over a Layer 2 network (e.g., a metropolitan Ethernet network) or a Layer 3 network (e.g., an IP network). In accordance with yet another alternative embodiment, receiving proxy cache 25 delivers the video program data over optical fiber network to client receivers 27. A specific implementation of this embodiment may include delivery of the digital program data over a fiber network to a gateway or interface on or near the premises where client receivers 27 are located. The gateway or interface converts the signal to an electronic signal for the final delivery to the client receivers 27, which, by way of example, may be set-top boxes 36.

Figure 4:
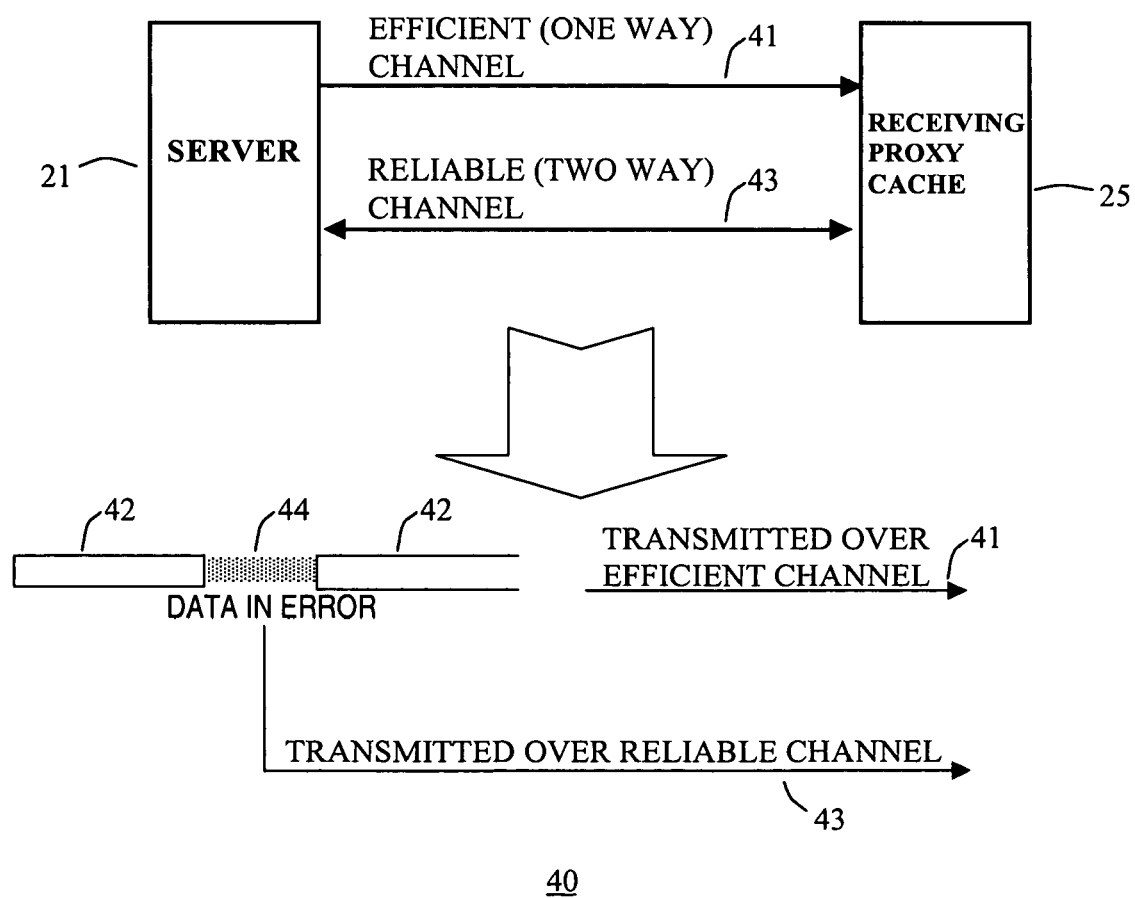
FIG. 4 illustrates a process for transporting data packets in accordance with an embodiment of the present invention.

FIG. 4 illustrates an exemplary embodiment of a process 40 for transporting data packets in accordance with a preferred embodiment of the present invention. To simplify the description of the data transport process 40 and by way of example, the data packets are assumed to have a uniformly fixed size. However, it should be understood that the present invention is equally applicable to data packets having variable sizes. Two separate logical channels 41 and 43, which are also referred to as logical paths, are established between server 21 and receiving proxy cache 25. Channel 41 is a one-way data transport channel with high efficiency but potentially low reliability. Channel 43 is a two-way data transport channel that is reliable but less efficient than channel 41. In accordance with the present embodiment, the majority of the data, represented by reference numeral 42 in FIG. 4, is delivered over highly efficient channel 41; and the portion of data in error, represented by reference numeral 44 in FIG. 4, is retransmitted over reliable channel 43.

For each continuous video program transmission from server 21 to receiving proxy cache 25, server 21 establishes two separate logical data paths 41 and 43 to deliver the data packets. A logical data path is defined by the addresses and port numbers of server 21 and receiving proxy cache 25. All actual deliveries of packets along a given logical path may not necessarily follow the same physical transmission link. In addition, multiple logical paths may share the same physical transmission link. Data paths established using UDP and TCP connections are two examples of logical data channels. UDP data paths are connectionless and highly efficient. TCP data paths are connection oriented, more reliable, but less efficient than UDP data paths.

Server 21 transmits data packets in two or more channels, e.g., channels 41 and 43 shown in FIG. 4. In accordance with one embodiment of the present invention, server 21 delivers the data packets to receiving proxy cache 25 according to UDP via primary delivery channel 41. For example, in the case of an MPEG-2 transport stream, server 21 fragments and encapsulates the data packets as the payload of a sequence of UDP packets. Additional packet header data may be inserted to carry timestamp information, such as those defined by the Real Time Protocol (RTP) standards. In secondary delivery channel 43, data packets are transmitted from server 21 to receiving proxy cache 25 using a highly reliable delivery protocol, e.g., TCP. In accordance with the present invention, secondary channel 43 may be used only to deliver those packets that receiving proxy cache 25 does not receive correctly over primary delivery channel 41 due to packet error, packet loss or a packet arriving out-of-order.

It should be noted that the above-described process 40 for transporting data is not limited to employing UDP and TCP protocols. Other protocols with similar characteristics (i.e., those with higher efficiency but lower reliability and those with higher reliability but lower efficiency) can also be used in accordance with the present invention.

In order to determine which channel server 21 will use to deliver a data packet, server 21 preferably receives notification from receiving proxy cache 25, which functions as a receiver for the data packets transported from server 21. In a normal transmission situation, server 21 delivers all data packets through channel 41 which results in a high transport efficiency and throughput. When transmission errors occur, some packets may be corrupted, lost or reordered in channel 41. Receiving proxy cache 25 then detects these errors and notifies server 21 of such problems. Such errors may be due to lost IP packets, out-of-order packets, duplicate packets, and bit errors within the packet payload. The UDP protocol optionally carries an error detection mechanism that allows a receiver (e.g., receiving proxy cache 25 in FIG. 4) to determine whether there are data errors within the payload of the UDP packet. However, the UDP protocol does not provide ways to tell the receiver whether an IP packet carrying UDP payload is lost. Detecting lost data packet is achieved by methods outside the scope of the UDP protocol implementation. In addition, receiving proxy cache 25 is preferably able to identify the precise location of the portion of data in error.

Upon detecting reception errors, receiving proxy cache 25 requests retransmission of the data packet in error via reliable channel 43. The retransmitted data packet may then be assembled back into the received copy of the original transmitted stream, which is being held in a buffer at receiving proxy cache 25. The data in the buffer at receiving proxy cache 25 is not delivered to the client receivers (e.g., client receiver 27 shown in FIG. 2 and set-top boxes 36 shown in FIG. 3) until the data integrity is established where needed via the retransmission and then verified by receiving proxy cache 25.

Because multiple errors may be detected in the received packet content, multiple retransmission requests may be initiated by receiving proxy cache 25. The retransmission request preferably contains the location of the data portion in error. The location may be identified, for example, by an internally defined locator scheme agreed upon by both the sender and the receiver (e.g., server 21 and receiving proxy cache 25, respectively).

Server 21 retransmits data packets via reliable channel 43 in response to requests received from receiving proxy cache 25. In accordance with one exemplary embodiment of the present invention, server 21 does not maintain a transmission buffer for data delivered over the unreliable channel 41. When a retransmission request occurs, server 21 goes back to the original data content and identifies the data section to be retransmitted, and copies the data from stored files into a retransmission buffer (not shown in FIG. 4) for transmitting to receiving proxy cache 25 via reliable channel 43. Generally, the lost data represents a relatively small portion of the content delivered, and the retransmission buffer only needs to hold the portion of data to be retransmitted and not yet acknowledged as correctly received. Such retransmission activities usually occur only sporadically and only for the portion of data where loss is detected by receiving proxy cache 25. For example, if the data transmission error rate is about 5%, roughly 5% of the data will be retransmitted over reliable channel 43.

Transmission data loss may, however, be affected by the bit rate at which server 21 delivers data to receiving proxy cache 25. Specifically, the network has a finite bandwidth capacity, which ideally server 21 should not exceed. By way of example, if the maximum available bandwidth of channel 41 is 100 megabits per second (Mbps), and server 21 transmits the data at a bit rate of 200 Mbps, 50% of the data will be lost. However, in general, the available bandwidth within a network is not known to server 21. Server 21 must estimate the available bandwidth based on information such as data packet loss rate, end-to-end delay, and other information returned from within the intermediate network nodes or from the receiving proxy cache 25. Preferably, the transmission rate of server 21 over efficient channel 41 is dynamically or adaptively controlled by time series values of such measured parameters as end-to-end delays and packet loss rate.

In the case when there are substantial amount of packet loss due to mismatch between the transmission rate and the available network bandwidth, the lost packets must then be delivered over the reliable channel 43. As a result, unacceptably long end-to-end delays may occur as the TCP channel can not keep up with the demand for retransmission. In addition, the increasing use of the TCP channel defeats the original objective of improving the transfer efficiency by using the UDP channel. In order to address this, the sender may need to throttle back the UDP delivery rate in correspondence to the number of retransmission requests pending on the TCP channel.

One approach is for the sender to maintain a count of the amount of data awaiting retransmission. The UDP delivery rate is reduced as the amount of data awaiting retransmission over TCP is increased. This feedback mechanism can be based on simple threshold, or based on continuous values. Let R, for example, be the delivery bit rate via the UDP channel. Let T be the amount of data to be retransmitted over a time-window of length S. For a threshold based mechanism, the value of R is updated periodically, such as follows:

At start: R is set at maximum possible transmission rate
While T>0: R=R−T/S
While T=0: R=R+d, where d is a fixed increment The main purpose of the rate-reduction algorithm is to ensure that the UDP channel does not flood the available bandwidth and cause excessive data loss within the network itself. The main purpose of the rate-increase algorithm is to ensure that the available bandwidth is fully utilized. Larger values of d can quickly bring up the transmission efficiency, but may also cause some oscillation around the optimal operation point. The optimal operation point is when T stays close to zero. Given that the round-trip delay of the re-transmission request depends on the network conditions, the value of R will be adjusted up and down around the optimal point, but never exactly at the point. The values chosen for S and d depend on the size of the receiver buffer in the receiving proxy cache. If the receiving proxy cache has a very large buffer, S can be set to a larger value and d can be set to a larger value as well. From the above description, we can see that larger S and d implies that the response to increasing amount of pending retransmission is slower, which is acceptable because the receiving proxy cache has sufficient amount of cache buffer available. The value of S should be such that it is at least a multiple of round-trip-delay (RTT) of the network so that the amount of retransmission pending is a more accurate estimate of the amount of packet loss during transit, instead of a measure dominated by packets still in transit.

A number of means may be used to obtain figures of merit for the underlying transport network between the transmitting server and the receiving proxy cache. The invention described here may be configured to use these figures of merit alone, or in any appropriate combination, as will be appreciated by one of ordinary skill in the art. One important measure is end-to-end delay between the transmitting server and the receiving proxy cache. Another is transmission delay jitter.

There are a number of ways to measure end-to-end delay. One approach is to measure round-trip times between the transmitting server and the receiving proxy cache, and then divide by two to arrive at an estimated end-to-end delay. Another approach is to use highly accurate clocks, synchronized to GPS or perhaps via NTP (Network Time Protocol), in conjunction with transmit timestamps, to accurately measure the actual one-way delays. End-to-end delay is a good measure of the network congestion. In IP network terms, this is equivalent to half of the round-trip-time (RTT), which is the time it takes a packet to transit the IP network from source to destination and back. In this case, from the transmitting server to the receiving proxy cache. There are well known methods to estimate the RTT using the 'ping' and 'traceroute' commands thus we shall not go into further detail on this topic. It is important to point out that (RTT/2) is a reasonable estimate of the end-to-end delay for packets sent via a UDP channel. But for TCP, the end-to-end delay is generally much longer than RTT. This is because TCP performs retransmission of packets and also has time-out mechanisms, which can end up with an effective end-to-end delay much larger than the RTT.

These figures of merit, as well as other key information, may readily be exchanged between the transmitting server and the receiving proxy cache, as will be appreciated by one of ordinary skill. For example, any important figures of merit to be sent in the "forward" direction by the transmitting server to the receiving proxy cache may be included where needed interspersed between payload data, or as additional header information. Similarly, any such real-time figures of merit that need to be sent from the receiving proxy cache to the transmitting server may be sent, for example, using UDP or a similar protocol. The system can be designed to minimize the effects of packet and information loss here by occasionally transmitting current updates in each direction as appropriate; if a given update is dropped or lost, the next update will most likely suffice. One possible approach is to combine ongoing "pilot" round-trip pings with metadata sequence numbers so that each party can at least tell when such an update has been lost, and can apply ordering appropriately.

An alternative way to measure end-to-end transmission delay and jitter is to use a timestamp field 64 (FIG. 6) that may be inserted into the payload of data packet 12 (FIG. 1). The timestamp indicates the time at which the associated data packet is transmitted from server 21. At receiving proxy cache 25, the timestamps embedded in two successive arriving packets are extracted. The difference between the two timestamps indicates the transmitting time difference, which may be represented by an algebraic symbol $\Delta T_T$, between the two data packets. Receiving proxy cache 25 measures the arriving time difference, represented by an algebraic symbol $\Delta T_A$, between the two corresponding data packets. Assuming that the clock inaccuracies of the clock at server 21 is negligible, the end-to-end transmission delay jitter is represented by $\Delta T_T$ minus $\Delta T_A$ (i.e., the difference between the transmitting time difference and the arriving time difference of the two corresponding data packets). In a preferred embodiment, the time stamp field may be 32 bits in size with each increment representing, for example, 1 microsecond (µs). Accordingly, the wrap-around time of the time stamp field is about 1.19 hours. In this embodiment, no confusion will arise unless the interval between two successive packets delivered from server 21 exceeds 1.19 hours, which is practically impossible.

Measuring packet loss may be achieved through a sequence number field 66 (FIG. 6) inserted into the payload of UDP packet 12 (FIG. 1). Receiving cache 25 can determine which packet is missing by inspecting the sequence number.

In accordance with one embodiment of the present invention, server 21 delivers data packets to receiving proxy cache 25 over channel 41 at a high initial bit rate, which may exceed the available bandwidth of channel 41 and therefore result in excessive data packet loss at receiving proxy cache 25. This initial high bit rate burst of data transfer preferably lasts a brief duration in order for receiving proxy cache 25 to be pre-filled with video data so that sufficient content is available in the buffer of receiving proxy cache 25 on behalf of the requesting client receiver, e.g., client receiver 27. The data packet loss rate information at receiving proxy cache 25 is transmitted back to server 21.

The retransmission request will be sent via the TCP channel 43 as it is reliable. The retransmission requests may be in the form essentially of a list of packets for which retransmission is needed, in priority order. The retransmission request may not have to be a list of individual packets, however. As data loss within the network can be highly bursty, tens or hundreds of packets in a row may be lost. Therefore, a more efficient way may be to send back the sequence number of the first retransmitted packet along with the length of this packet 'run.' Thus, the server could efficiently determine which packets needed to be present. The server could even choose to ignore a high-priority retransmission request if it had already recently retransmitted a given packet. It is in many cases preferable for the server to execute all retransmission requests regardless of whether the request has been fulfilled before or not. The receiving proxy cache may, therefore, be relied upon to determine whether two retransmitted packets are the same and whether it thus needs to discard one of them. When there is sufficient buffering at the receiving proxy cache, this shifts the burden of the computation from the server to the receiving proxy cache. Server 21 may also determine whether or not to retransmit the lost packets. Alternatively, server 21 may decide not to retransmit the data and let the receiving proxy cache 25 provide its own ways to handle the lost data packets as the data is delivered to the requesting clients.

In accordance with one embodiment of the present invention, proxy 25, upon detecting data loss, injects a separate video segment containing a status message saying something like "experiencing network delays". The message may last a few seconds allowing receiving proxy cache 25 to read past the buffer portion of the lost data. In accordance with another embodiment, this status message injection is performed by the client receiver 27 instead of the receiving proxy cache to the same effect. In accordance with another embodiment, receiving proxy cache 25 can repeat the last good Intra frame (I-frame) in the original MPEG video program data, resulting in a frozen display of the video sequence. For other forms of data, analogous methods may be used.

In a typical environment, server 21 may deliver multiple video programs to receiving proxy cache 25. According to one embodiment, server 21 establishes a data transmission channel, e.g., channel 41 shown in FIG. 4, for each video program. In other words, an individual transmission channel is associated with each video program. This means that multiple data transmission channels, which are also referred to as transmission sessions, are required for transmitting multiple programs from server 21 to receiving proxy cache 25. Such sessions, e.g., UDP transmission sessions, can be dynamically allocated. In an alternative embodiment of the present invention, multiple video programs can share the same transmission channel or session. Different video programs can be logically separated within the same transmission session by using additional program identification fields. In one embodiment, the ability to uniquely identify different video programs is achieved by adding additional fields within the UDP payload 12 (FIG. 1).

Figure 5:
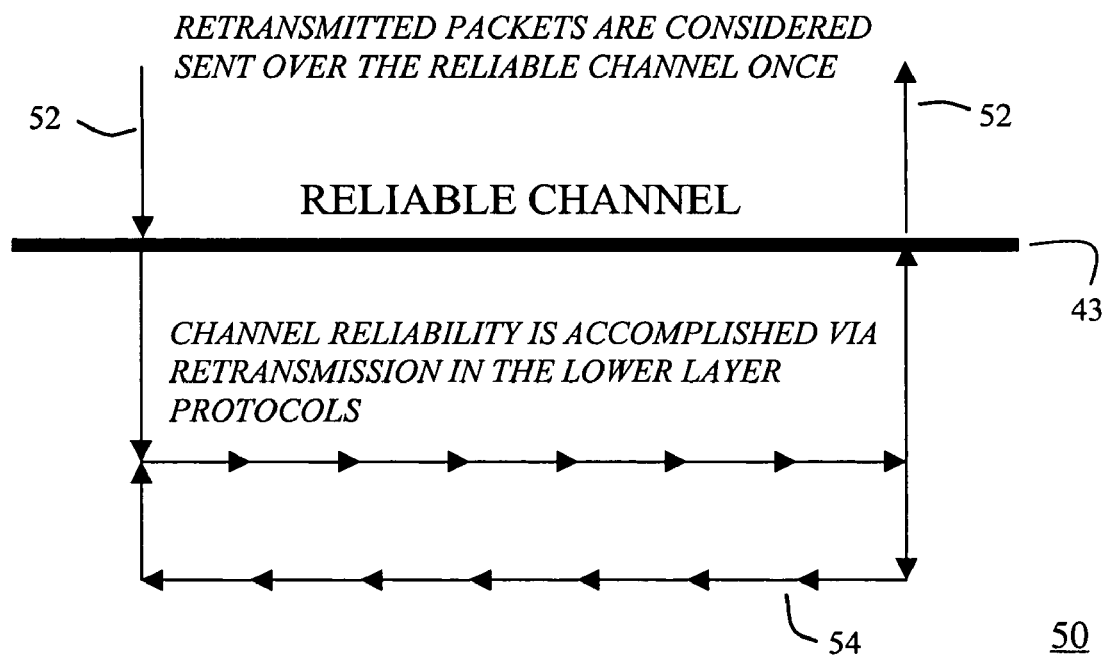
FIG. 5 illustrates a data retransmission process for data in error in accordance with an embodiment of the present invention.

FIG. 5 illustrates a data retransmission process 50 in accordance with a preferred embodiment of the present invention. Retransmission over reliable channel 43 may result in multiple retransmission attempts of the actual data packets. Retransmission activity is performed within a reliable channel protocol, e.g., TCP, in a network protocol stack and driver level, and is transparent to server retransmission activity itself. In other words, server 21 considers that only one retransmission 52 is needed for a lost data packet, even though multiple retransmissions 54 may sometimes in fact be needed for the lost data packet within the TCP layer itself.

As mentioned above, server 21 often delivers multiple video programs to receiving proxy cache 25. Data loss can occur in multiple video programs, resulting in multiple retransmission requests from receiving proxy cache 25. The retransmission of data is performed over a reliable channel, e.g., TCP channel 43. In one embodiment, server 21 establishes a retransmission channel or session, e.g., TCP channel 43, for each video program. In other words, an individual retransmission channel is associated with each video program. Therefore, multiple TCP sessions are required. Such multiple sessions may be dynamically allocated because video program requests are generally dynamic. Establishing and tearing down the TCP sessions can impose substantial amounts of time and processing cost and large numbers of retransmission sessions may also be limited by the number of available TCP ports. In an alternative embodiment and in order to improve the efficiency of the retransmission channel, multiple video programs may share the same retransmission channel. In this embodiment, the retransmission session may remain open for all retransmission requests. Different video programs may also be logically separated from each other within the same TCP session by using additional program identification fields. For example, the ability to uniquely identify different video programs can be achieved by adding additional fields within the TCP payload 12 (FIG. 1).

Generally, the receiving buffer (not shown in FIG. 4) at receiving proxy cache 25 is large enough to contain data transmitted over a duration much longer than the round trip delay (often up to hundreds of times larger than round trip delays). There is generally a lack of urgency in detecting data in error and requesting retransmission unless the data in error is close to the read point for transmission from receiving proxy cache 25 to a client receiver, e.g., client receiver 27 shown in FIG. 2.

In accordance with another embodiment of the present invention, UDP header field 14 (FIG. 1) may include a checksum field for detecting a data transmission error. Upon detecting a data transmission error, receiving proxy cache 25 treats the associated UDP packet as being lost and discards the packet from the buffer in receiving proxy cache 25. Therefore, erroneous data packets are treated the same as lost data packets.

In accordance with yet another embodiment of the present invention, erroneous data packets may be treated as immediate notice that retransmission will be required. Lost data packets and very late data packets are indistinguishable—when an expected packet has not arrived after a given time threshold, it is assumed to have been lost, and only then will retransmission be requested if appropriate. Whether the retransmission request is sent immediately depends on the urgency of the need for the retransmission. The receiving proxy cache sends an urgent retransmission request only when it detects that it will need the data relatively soon.

In accordance with one embodiment of the present invention, a sequence number field is introduced into the transmitted data packets so that receiving proxy cache 25 can determine which packet is missing by inspecting the sequence number. The sequence number fields may also be attached to the data packets. In a specific embodiment illustrated in FIG. 6, a sequence number field 66 is attached to data packet 60 as an extension of UDP payload 62. In this particular embodiment, sequence number field 66 has 32 bits. However, a sequence number field may be of different sizes in accordance with a preferred embodiment of the present invention.

In accordance with another embodiment of the present invention, the data packet retransmission will be performed at the same level where sequence number field 66 is inserted. In the specific embodiment illustrated in FIG. 6, sequence number field 66 is attached to data packet 60 as an extension of UDP payload 62, and the retransmission is performed at the UDP level. Alternatively, the sequence number field is inserted at the transport packet level, e.g., at the level of MPEG transport packets. For example, a 32 bit sequence number field may be inserted once every 100 transport packets grouped together as a transport packet group. This sequence number then also appears as part of the transport stream payload. In this embodiment, the retransmission is performed at transport packet level. A transport packet group containing 100 transport packets is retransmitted as a whole even if only one transport packet in the transport packet group is lost. Of course, a transport packet group may have other fixed numbers of packets, say, 200, 1000, etc. It is worthwhile to point out that because each retransmission channel may use a different protocol, in the case of the need to retransmit payload originally sent on the UDP channel, the UDP packet itself is not sent in the retransmission channel. Rather, it is the UDP payload that gets retransmitted as the payload of the reliable TCP channel. The same can be said for the case of the transport packet group retransmission.

Figure 6:
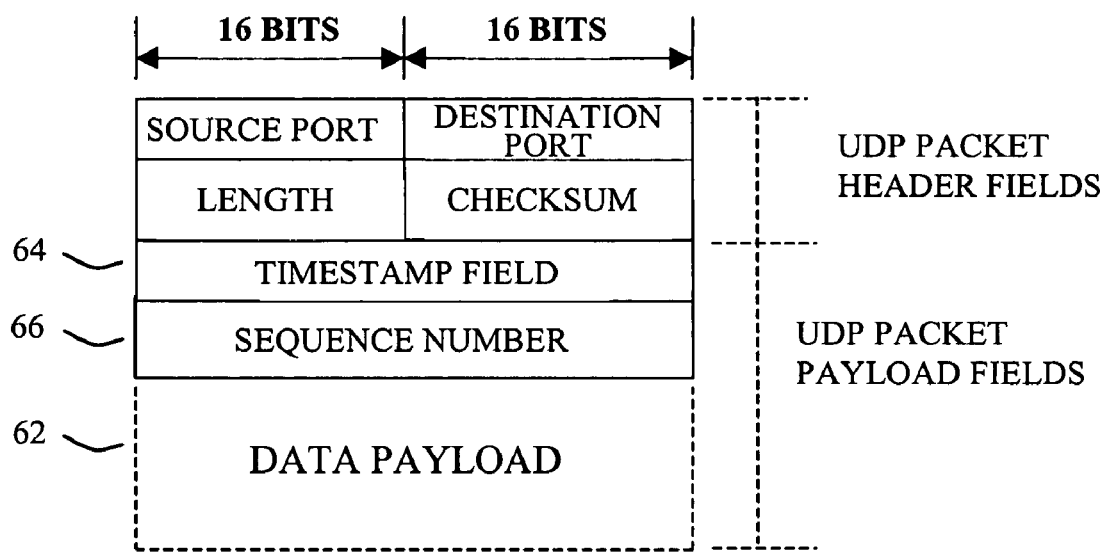
FIG. 6 illustrates a User Datagram Protocol data packet with a sequence number field attached thereto in accordance with an embodiment of the present invention.

In the embodiment with sequence number field inserted in the UDP payload, the sequence number increases by one for each UDP packet delivered out of server 21 for a given video program stream. The sequence number will generally wrap around to its original value at some point. If this wraparound period is short, it is possible that all data packets are lost during the entire wraparound period, which can mislead receiving proxy cache 25 to consider that fewer data packets are lost. In order to allow sufficient transmission before the sequence number field value wraps around, the sequence number field is preferably relatively large, e.g., 32 bits in size as shown in FIG. 6. By way of example, if each UDP packet payload contains seven MPEG-2 transport packets as payload and each transport packet has a fixed length of 188 bytes, the sequence number field will wrap back to its original value after 4,294,967,296 UDP packets are sent. At 7×188 bytes per UDP packet payload, this is equivalent to about 5.6 terabytes (TBs) of data transmitted before the sequence number is wrapped back to the beginning. This means that the sequence number can identify up to 5.6 TBs of consecutive data loss. This is sufficient to handle almost all realistic cases of packet losses. Fewer bits may be used for the sequence number fields, resulting in more frequent wraparound of the field values. As long as the wraparound period is sufficiently long, the sequence number field can be used to correctly determine whether a packet is lost.

Because the transmission from server 21 to receiving proxy cache 25 has end-to-end latencies and the delivered data packets may be out of order, receiving proxy cache 25 is preferably able to detect these out-of-order packets and hold off forwarding the packets to client receiver 27 until all of the delivered packets are in the right order. A buffer in receiving proxy cache 25 may be used to temporarily store the delivered data packets. The tolerance level of the latencies determines the amount of buffering required. Considering that the packets can at most be out of order by the maximum number of packets in transit, the maximum out of order is therefore determined by the end to end delivery latency, which is closely tied to RTT. It is generally assumed, in the context of this invention, that the amount of buffering within the receiving proxy cache buffer is substantially larger than the number of packets in transit due to end-to-end latency. It should be understood, however, that this may not always be the case.

Figure 7:
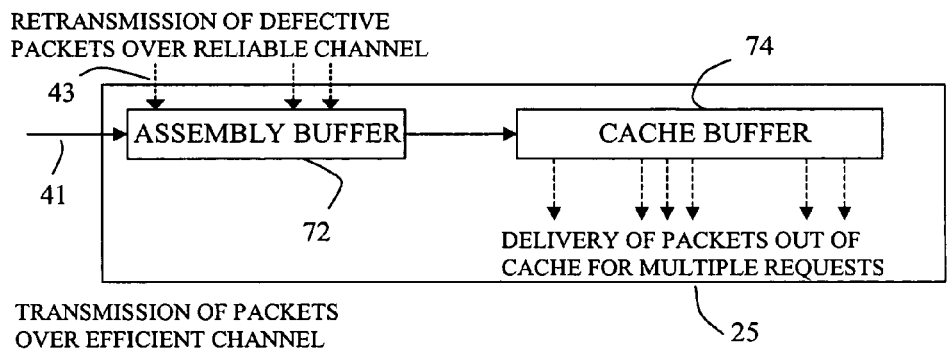
FIG. 7 illustrates a buffer structure in a receiving proxy cache in accordance with an embodiment of the present invention.

In accordance with an embodiment of the present invention shown in FIG. 7, receiving proxy cache 25 includes at least two buffers, i.e., an assembly buffer 72 and a cache buffer 74, preferably close to each other. Assembly buffer 72 delivers its content to cache buffer 74. Buffers 72 and 74 may be used to store content associated with a single video program. In one embodiment, receiving proxy cache 25 includes multiple pairs of assembly and cache buffers. In many instances, receiving proxy cache 25 with multiple pairs of assembly and cache buffers may be preferred in relaying multiple video programs from server 21 to client receivers, with one pair of assembly and cache buffers for each video program.

The received data packets are held in assembly buffer 72 and will not be released to cache buffer 74 until all data packets are received and are in the right order. Therefore, assembly buffer 72 preferably has sufficient capacity to accommodate the maximum latency including detection of error packets and subsequent retransmissions of incorrectly received packets.

Figure 8:
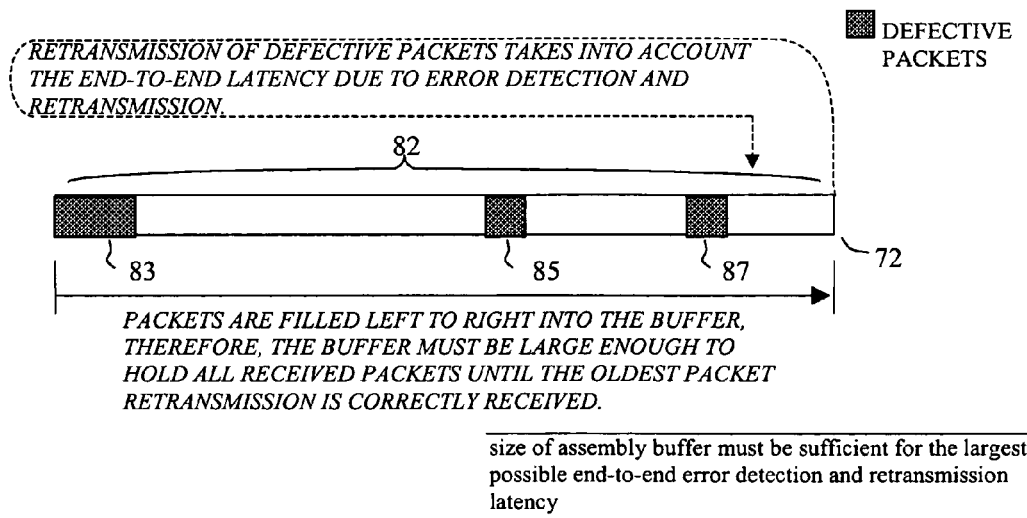
FIG. 8 illustrates an assembly buffer in a receiving proxy cache in accordance with an embodiment of the present invention.

FIG. 8 illustrates assembly buffer 72 with data packets 82 stored therein. By way of example, FIG. 8 shows defective data packet locations 83, 85, and 87 that need to be retransmitted from server 21 to receiving proxy cache 25 over reliable data transmission channel 43. Retransmission of defective data packets 83, 85, and 87 takes into account the end-to-end latency caused by error detection and retransmission. Preferably, assembly buffer 72 is large enough to hold all data packets 82 until all retransmitted data packets are correctly received. In other words, the size of assembly buffer 72 is preferably sufficient for the longest possible end-to-end error detection and retransmission latency.

Cache buffer 74 receives the data packets from assembly buffer 72 and holds the content that is frequently accessed by the client receivers, e.g., client receiver 27 shown in FIG. 2. The size of cache buffer 74 determines the efficiencies of the cache algorithms. The larger cache buffer 74, the more likely that requested media content is within cache buffer 74, and receiving proxy cache 25 can then deliver the content out of cache buffer 74 without interacting with server 21. The combined use of the reassembly buffer and cache buffer enables the receiving proxy cache to mask out the effect of retransmission to the clients. Specifically, if the clients request data from receiving proxy cache that has been received ahead of the delivery time, the clients experience no data deliver delay, all retransmission delays are absorbed by the assembly buffer. In other words, if the client is requesting a video bitstream from the receiving proxy cache, the receiving proxy cache can deliver the data with low or no latency.

Buffers are not necessarily first-in-first-out. For example, retransmission activity can disrupt the receiving order of the data packets within assembly buffer 72. The correct ordering of the data packets within assembly buffer 72 may be maintained by sequence numbering using sequence number field 66 described above with reference to FIG. 6. In one embodiment, the readout order of the data packets from cache buffer 74 follows the original order at which the data packets are transmitted from server 21. In addition, multiple concurrent read-out requests of the same buffer can be performed, which implies that the buffer output is not in strict order.

In accordance with one embodiment of the present invention, assembly buffer 72 and cache buffer 74 do not have to be separately constructed. In accordance with an alternative embodiment of the present invention, assembly buffer 72 and cache buffer 74 share the same logical buffer with a virtual boundary between them. In this embodiment, the retransmission activity is performed in the assembly portion of the buffer and the delivery-to-client activity is performed in the cache portion of the buffer. Once the head of line portion of the data content within the assembly portion is complete, it can be considered part of the cache portion. In other words, there is really no actual transfer or copy of data from the assembly portion to the cache portion. The boundary between the two buffer portions simply gets set to a new buffer location. As the cache portion gets freed up because older content data has been delivered to client receiver 27, it may be re-allocated back to the assembly portion when needed via a memory manager.

Figure 9:
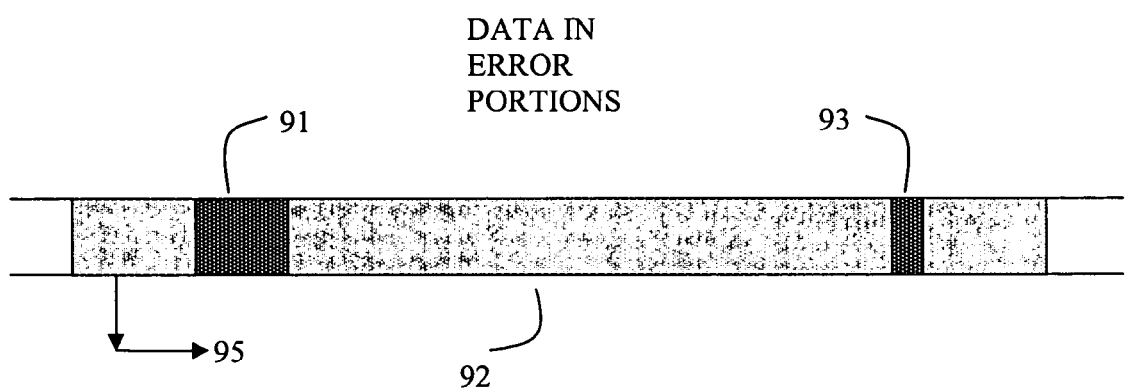
FIG. 9 illustrates a cache buffer in a receiving proxy cache in accordance with an embodiment of the present invention.

Data in error is preferably retransmitted by server 21 and successfully received at receiving proxy cache 25 before the data is delivered out of receiving proxy cache 25. Data errors may occur in different buffer locations of receiving proxy cache 25 as illustrated in FIG. 9. In one situation, data in error 93 may occur in locations that will not be read by a read pointer 95 in receiving proxy cache 25 for a significant time period because a substantial amount of correct data 92 exists ahead of data in error 93. In another situation, data in error 91 may occur just before its anticipated access by read pointer 95. These two situations call for two different approaches to the retransmission. In the first case, since the urgency for retransmission is low, receiving proxy cache 25 may decide to postpone the retransmission request if there is a more urgent retransmission request. In the second case, the retransmission is preferably done as soon as possible, i.e., the urgency is high. Otherwise, read pointer 95 will reach data in error portion 91 quickly and read the incorrect data. Therefore, retransmission of data in error is preferably prioritized according to the urgency of the data in error portion.

It should be noted that this data urgency may change according to the location of read pointer 95 in receiving proxy cache 25. Because a buffer may have multiple read pointers for providing output to multiple client requests, the read pointers are dynamically adjusted according to the arrival and departure of client requests. Examples of client requests include play, fast-forward, rewind, pause, stop, etc. At any time, the urgency for retransmission for a data in error portion depends on its distance from its nearest read pointer, e.g., read pointer 95 in FIG. 9, just ahead of data in error portion 91, would have a relatively high urgency. The distance can be measured in number of bits, the amount of time, or the like. In an alternative embodiment, a movable virtual boundary in a logical buffer in receiving proxy cache 25 separates assembly buffer 72 from cache buffer 74. In this embodiment, the time it takes read pointer 95 to read from the current position to the end of cache buffer 74 defines the urgency. It should be noted that the end of cache buffer 74 is also the beginning of assembly buffer 72, where the data in error exists.

An urgent retransmission request implies that the data should be retransmitted soon. Otherwise, receiving proxy cache 25 risks not being able to deliver the data to the client receiver. Because the underlying IP network generally does not guarantee the end-to-end delivery latency required for on-demand data transmission environment, the urgency of the retransmission is reflected in the retransmission wait time of receiving proxy cache 25, i.e., the duration between the time when the retransmission request is generated and held in the retransmission request queue to the time when the retransmitted data is actually delivered to receiving proxy cache 25. Therefore, all else being equal, all retransmission requests are preferably sent out at the earliest possible time. Once the proxy caching process starts to run, some retransmission requests can be more urgent than others. In these cases, the urgency is usually not completely under the management control of receiving proxy cache 25. For example, as discussed, the urgency can also depend upon the changing demands at each client receiver.

In accordance with one embodiment of the present invention, the urgency when receiving proxy cache buffer 74 is initially filled by the incoming data can be controlled. In this case, it is preferred to fill or construct cache buffer 74 as quickly as possible to establish an initial buffer fill so that read pointer 95 will have a substantial amount of available data ahead of potential data in error. Filling or constructing cache buffer 74 quickly reduces the risks of the portion of the missing data due to error being too close to read pointer 95. In this case, it may imply that other buffers may need to postpone receiving data until the buffer with urgent retransmission requests is filled to certain level first.

Figure 10:
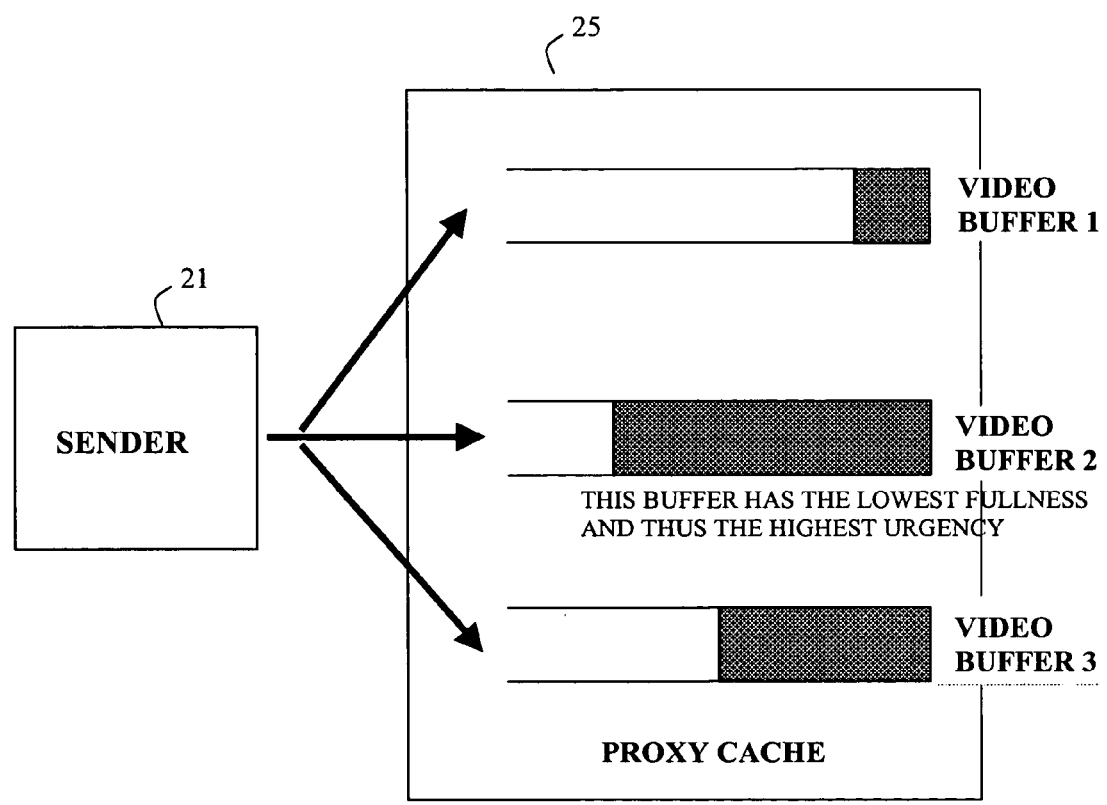
FIG. 10 illustrates the degree of data retransmission urgency in a receiving proxy cache buffer in accordance with an embodiment of the present invention.

Accordingly, the transmission of data into receiving proxy cache buffer 74 may have a degree of urgency associated with it. This degree of urgency is meaningful when there are multiple receiving proxy cache buffers, where each may be allocated for a different video program. The transmission urgency is a measure applied to specific video programs on server 21. In a system where server 21 feeds data, e.g., video programs, to multiple receivers, e.g., receiving proxy caches, server 21 must determine which receiver buffer should receive data at the highest priority and the appropriate bit rate, as illustrated in FIG. 10. Immediately filling a buffer in receiving proxy cache 25 with a large amount of data can reduce the urgency of retransmission requests since retransmission requests will thus likely be for data portions substantially further from the read pointer 95 shown in FIG. 9. However, it is important to point out that the server 21 must rely on the receiving proxy cache to provide the urgency information as the buffers are in the receiving proxy cache, not in the server. This information preferably is sent from the receiving proxy cache back to the sender via reliable return channel. Alternatively, it may be sent back occasionally and redundantly via an unreliable return channel. Therefore, the server decides which video program data to send first based on the priority set by the urgency measures provided by the receiving proxy cache.

By now it should be appreciated that a method and a system for transporting data between a server and a receiving proxy cache over a network has been provided. In accordance with one embodiment of the present invention, the data is transported from a server to a receiving proxy cache over two logical channels. The data is first sent from the server to the receiving proxy cache over an efficient data transmission channel. The receiving proxy cache verifies the status of the data transmitted over the efficient channel. If there is an error in the data transmission, a portion of the data associated with the error is retransmitted from the server over a reliable data transmission channel. The data transport system of the present invention is both efficient and reliable. It has high data transport throughput with minimum transmission delay and minimum buffer delay. It is also able to guarantee data delivery to the receiving process in the right order.

While various embodiments of the present invention have been described with reference to the drawings, these are not intended to limit the scope of the present invention, which is set forth in the appended claims. Various modifications of the above described embodiments can be made by those skilled in the art after reading this specification. All such modifications are within the scope and true spirit of the present invention.

The invention claimed is:

1. A method for providing reliable data transport, comprising:
    packaging data stored on a server into a plurality of data packets, including inserting a sequence number field into a payload of the data packets;
    transmitting the plurality of data packets to a first buffer in a receiving proxy cache over an efficient channel;
    verifying a transmission status of the plurality of data packets in the first buffer at the receiving proxy cache using at least one of the sequence number field, a checksum field, and a timestamp field;
    retransmitting at least one data packet to the receiving proxy cache over a reliable channel in response to the receiving proxy cache detecting a transmission error of the at least one data packet;
    transferring the plurality of data packets from the first buffer to a second buffer in the receiving proxy cache in response to the plurality of data packets transmitted to the first buffer being complete; and
    forwarding the plurality of data packets from the second buffer at the receiving proxy cache to at least one of a plurality of client receivers via at least one data stream connection in response to a request.

2. The method of claim 1, wherein transmitting the plurality of data packets to a receiving proxy cache over an efficient channel comprises transmitting the plurality of data packets in accordance with User Datagram Protocol.

3. The method of claim 1, wherein retransmitting the data packet to the receiving proxy cache over a reliable channel comprises transmitting the data packet in accordance with Transmission Control Protocol.

4. The method of claim 1, wherein verifying a transmission status of the plurality of data packets at the receiving proxy cache comprises detecting data packet reordering.

5. The method of claim 1, wherein verifying a transmission status of the plurality of data packets at the receiving proxy cache comprises detecting data packet loss.

6. The method of claim 1, wherein verifying a transmission status of the plurality of data packets at the receiving proxy cache comprises detecting data packet corruption using the checksum.

7. The method of claim 5, wherein detecting data packet loss comprises:
    detecting data transmission delay; and
    identifying a data packet as being lost in response to the transmission delay of the data packet exceeding a threshold.

8. The method of claim 5, further comprising, in response to the data packet loss, injecting a separate content message segment in response to the data packet loss.

9. The method of claim 5, further comprising, in response to the data packet loss, generating a copy of a data payload packet representing a content frame preceding the lost data packet.

10. The method of claim 1, wherein forwarding the plurality of data packets received at the receiving proxy cache to a client receiver comprises:
    delivering the plurality of data packets to an edge gateway via a network interface;
    packaging the plurality of data packets received at the edge gateway into a plurality of multiplexes; and transporting the plurality of multiplexes to a client receiver over a coaxial or fiber-optic cable, twisted pair cable, or other communication transport means.

11. The method of claim 1, wherein forwarding the plurality of data packets received at the receiving proxy cache to a client receiver comprises:
   delivering the plurality of data packets to an edge Quadrature Amplitude Modulation gateway via a coaxial cable interface.

12. The method of claim 1, wherein forwarding the plurality of data packets received at the receiving proxy cache to a client receiver comprises:
   transporting the plurality of data packets to a client receiver over a coaxial or fiber-optic cable, twisted-pair cable, or other communication transport means.

13. The method of claim 1, wherein forwarding the plurality of data packets received at the receiving proxy cache to a client receiver comprises:
   delivering the plurality of data packets to an edge Quadrature Amplitude Modulation gateway via a co-axial cable interface;
   packaging the plurality of data packets received at the edge Quadrature Amplitude Modulation gateway into a plurality of multiplexes; and
   transporting the plurality of multiplexes to a client receiver over a coaxial or fiber-optic cable, twisted pair cable, or other communication transport means.

14. The method of claim 1, wherein forwarding the plurality of data packets received at the receiving proxy cache to a client receiver comprises:
   delivering the plurality of data packets to a Digital Subscriber Line network via a Digital Subscriber Line Access Multiplexer (DSLAM).

15. The method of claim 14, wherein forwarding the plurality of data packets received at the receiving proxy cache to a client receiver comprises:
   packaging the plurality of data packets received at a DSLAM into a plurality of multiplexes.

16. The method of claim 15, wherein forwarding the plurality of data packets received at the receiving proxy cache to a client receiver comprises:
   transporting the plurality of multiplexes to a client receiver over a Digital Subscriber Line.

17. The method of claim 1, wherein forwarding the plurality of data packets received at the receiving proxy cache to a client receiver comprises delivering the plurality of data packets to a client receiver over a Layer 2 network.

18. The method of claim 1, wherein forwarding the plurality of data packets received at the receiving proxy cache to a client receiver comprises delivering the plurality of data packets to a client receiver over a Layer 2 metro Ethernet network.

19. The method of claim 1, wherein forwarding the plurality of data packets received at the receiving proxy cache to a client receiver comprises delivering the plurality of data packets to a client receiver over an Internet Protocol network.

20. The method of claim 1, wherein forwarding the plurality of data packets received at the receiving proxy cache to a client receiver comprises delivering the plurality of data packets to a client receiver over a Layer 3 network.

21. The method of claim 1, wherein forwarding the plurality of data packets received at the receiving proxy cache to a client receiver comprises delivering the plurality of data packets to a client receiver over a Layer 3 Internet Protocol network.

22. The method of claim 1, wherein transmitting a data packet to the receiving proxy cache over a reliable channel further comprises:
   transmitting a data retransmission request to the server in response to the receiving proxy cache detecting a transmission error of the data packet; and
   transmitting the data packet to the receiving proxy cache over the reliable channel in response to the data retransmission request from the receiving proxy cache.

23. The method of claim 22, wherein transmitting a data retransmission request comprises indicating the location of the data packet requiring retransmission in the plurality of data packets.

24. The method of claim 23, wherein indicating the location of the data packet requiring retransmission in the plurality of data packets comprises identifying the order of the plurality of data packets using the sequence number field inserted at a protocol level.

25. The method of claim 24, wherein transmitting a data packet to the receiving proxy cache over reliable channel further comprises transmitting the data payload packet to the receiving proxy cache at the protocol level at which the sequence number field is inserted.

26. The method of claim 23, wherein transmitting a data retransmission request comprises indicating the locations of a plurality of data packets requiring retransmission among the plurality of data packets.

27. The method of claim 1, wherein transferring the plurality of data packets from the first buffer to a second buffer in the receiving proxy cache comprises:
   establishing a virtual boundary in a logical buffer in the receiving proxy cache dividing the logical buffer into a first portion designated as the first buffer and a second portion designated as the second buffer; and
   moving the virtual boundary in the logical buffer to allocate data packets from the first portion of the logical buffer to the second portion of the logical buffer in response to the plurality of data packets transmitted to the receiving proxy cache being complete.

28. The method of claim 1, wherein transmitting the plurality of data packets to a receiving proxy cache comprises transmitting plural sets of data associated with a plurality of content programs to the receiving proxy cache.

29. The method of claim 28, further comprising storing the plural sets of data associated with the plurality of content programs in a plurality of buffers in the receiving proxy cache.

30. The method of claim 28, further comprising storing the plural sets of data associated with the plurality of content programs in a shared buffer in the receiving proxy cache.

31. The method of claim 30, further comprising identifying each of the plural sets of data associated with the plurality of content programs.

32. The method of claim 28, wherein transmitting plural sets of data associated with a plurality of content programs to the receiving proxy cache comprises transmitting the plural sets of data separately over a plurality of data transmission channels.

33. The method of claim 28, wherein transmitting plural sets of data associated with a plurality of content programs to the receiving proxy cache comprises transmitting the plural sets of data separately over a shared data transmission channel.

34. The method of claim 28, further comprising:
   verifying the transmission status of the plural sets of data at the receiving proxy cache;
   retransmitting a first data packet in a first set of data associated with a first content program to the receiving proxy cache in response to the receiving proxy cache detecting a transmission error of the first data packet; and retransmitting a second data packet in a second set of data associated with a second content program to the receiving proxy cache in response to the receiving proxy cache detecting a transmission error of the second data packet.

35. The method of claim 34, wherein retransmitting a first data packet and retransmitting a second data packet comprises transmitting the first data packet and the second data packet over a first reliable channel and a second reliable channel respectively, separated from each other.

36. The method of claim 34, wherein retransmitting a first data packet and retransmitting a second data packet comprises transmitting the first data packet and the second data packet over a shared reliable channel.

37. The method of claim 36, further comprising keeping the shared reliable channel in an open state.

38. The method of claim 1, wherein a rate of transmitting the plurality of data packets to the receiving proxy cache over the efficient channel is dynamically adjusted at the transmitting server in response to network conditions.

39. The method of claim 38, wherein the dynamic adjustment is performed based on measures or estimates of network performance.

40. The method of claim 39, wherein the measure of network performance is based on the amount of data awaiting transmission over the efficient channel.

41. The method of claim 39, wherein the measure of network performance is based on the amount of data awaiting transmission over the reliable channel.

42. The method of claim 38, wherein the dynamic adjustment is based on a threshold performance value.

43. The method of claim 38, wherein the dynamic adjustment is based on continuous performance values.

44. A data transport system for reliably and efficiently transporting data over a network, comprising:
a server configured to package data into a plurality of data packets, including inserting a sequence number field into a payload of the data packets;
a receiving proxy cache configured to control transmission of the plurality of data packets from the server to a first buffer of the receiving proxy cache over an efficient channel;
wherein the receiving proxy cache is configured to verify a transmission status of the plurality of data packets in the first buffer using at least one of the sequence number field, a checksum field, and a timestamp field;
wherein the receiving proxy is further configured to control retransmission of a data packet from the server to the receiving proxy, over a reliable channel in response to the receiving proxy detecting a transmission error associated with the data packet;
wherein the receiving proxy cache is further configured to transfer the plurality of data packets from the first buffer to a second buffer in the receiving proxy cache in response to the plurality of data packets transmitted to the first buffer being complete;
wherein the receiving proxy cache is further configured to store the plurality of data packets in the second buffer; and
wherein the receiving proxy cache is further configured to forward the plurality of data packets from the second buffer to a client receiver via at least one data stream connection in response to a request.

45. The data transport system of claim 44, wherein:
the efficient channel configured to transmit the plurality of data packets in accordance with User Datagram Protocol.

46. The data transport system of claim 44, wherein:
the reliable channel is configured to retransmit the data packet in accordance with Transmission Control Protocol.

47. The data transport system of claim 44, further comprising a read data pointer in the receiving proxy coupled to the data stream connection the data pointer being configured to access the plurality of data packets in the receiving proxy.

48. The data transport system of claim 44, wherein the first buffer and the second buffer are separated by a virtual boundary there between.

49. The data transport system of claim 44, wherein the receiving proxy comprises:
a plurality of assembly buffers configured to store the plurality of data packets corresponding to a plurality of content programs transmitted from the server; and
a plurality of cache buffers coupled to the plurality of assembly buffers configured to receive the plurality of data packets from the plurality of assembly buffers in response the plurality of data packets being complete and in correct order.

50. The data transport system of claim 44, wherein the data stream connection comprises an optical fiber network, a wired network, or a wireless network.

51. The data transport system of claim 44, wherein the data stream connection comprises an optical fiber network.

52. The data transport system of claim 44, wherein the data stream connection comprises a Digital Subscriber Line.

53. The data transport system of claim 44, wherein the data stream connection comprises a Layer 2 metro Ethernet network.

54. The data transport system of claim 44, wherein the data stream connection comprises an Internet Protocol network.

55. The data transport system of claim 44, wherein the data stream connection comprises a Layer 3 network.

56. The data transport system of claim 44, wherein the data stream connection comprises a Layer 3 Internet Protocol network.

57. The data transport system of claim 44, wherein a rate of transmitting the plurality of data packets to the receiving proxy over the efficient channel is dynamically adjusted at the transmitting server in response to network conditions.

58. The data transport system of claim 57, wherein the dynamic adjustment is performed based on measures or estimates of network performance.

59. The data transport system of claim 58, wherein the measure of network performance is based on the amount of data awaiting transmission over the efficient channel.

60. The data transport system of claim 58, wherein the measure of network performance is based on the amount of data awaiting transmission over the reliable channel.

61. The data transport system of claim 57, wherein the dynamic adjustment is based on a threshold performance value.

62. The data transport system of claim 57, wherein the dynamic adjustment is based on continuous performance values.

* * * * *

UNITED STATES PATENT AND TRADEMARK OFFICE
CERTIFICATE OF CORRECTION

PATENT NO. : 7,643,480 B2
APPLICATION NO. : 11/041079
DATED : January 5, 2010
INVENTOR(S) : Hain-Ching Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Column 17, line 20 (Claim 13): Delete "co-axial" and replace with --coaxial--;

Column 18, line 17 (Claim 25): Delete "over" and replace with --over a--;

Column 19, line 9 (Claim 35): Delete "channel" and replace with --channel,--; and Column 20, line 11 (Claim 47): Delete "connection" and replace with --connection,--.

Signed and Sealed this

Sixteenth Day of November, 2010

David J. Kappos
*Director of the United States Patent and Trademark Office*